(12) United States Patent
Shofar

(10) Patent No.: US 7,429,122 B1
(45) Date of Patent: Sep. 30, 2008

(54) LIGHTING DEVICE

(75) Inventor: Ya'akov Shofar, Kibbutz Ein Hashofet (IL)

(73) Assignee: Eltam Ein Hashofet, Kibbutz Ein Hashofet (IL)

( * ) Notice: Subject to any disclaimer, the term of this patent is extended or adjusted under 35 U.S.C. 154(b) by 0 days.

(21) Appl. No.: 11/448,793

(22) Filed: Jun. 8, 2006

Related U.S. Application Data

(63) Continuation-in-part of application No. 10/879,084, filed on Jun. 30, 2004, now abandoned.

(30) Foreign Application Priority Data

Jul. 3, 2003 (IL) .................................. 156755
Oct. 21, 2003 (IL) .................................. 158519

(51) Int. Cl.
*F21V 29/00* (2006.01)

(52) U.S. Cl. ................. 362/545; 362/542; 362/543

(58) Field of Classification Search ............ 362/800, 362/470, 545, 240, 247
See application file for complete search history.

(56) References Cited

U.S. PATENT DOCUMENTS

| | | | |
|---|---|---|---|
| 5,136,287 A | | 8/1992 | Borenstein |
| 5,161,879 A | * | 11/1992 | McDermott ................. 362/206 |
| 5,567,036 A | * | 10/1996 | Theobald et al. ............ 362/485 |
| 5,632,551 A | * | 5/1997 | Roney et al. ................. 362/485 |
| 5,857,767 A | * | 1/1999 | Hochstein .................... 362/294 |
| 6,367,949 B1 | * | 4/2002 | Pederson ..................... 362/240 |
| 6,461,008 B1 | | 10/2002 | Pederson |
| 6,483,439 B1 | | 11/2002 | Vukosic |
| 6,678,980 B2 | * | 1/2004 | Arias ............................. 40/542 |
| 7,055,994 B2 | * | 6/2006 | Martin ........................ 362/470 |
| 7,070,310 B2 | * | 7/2006 | Pond et al. ................... 362/545 |
| 7,221,104 B2 | * | 5/2007 | Lys et al. ..................... 315/291 |

\* cited by examiner

*Primary Examiner*—Anabel M Ton
(74) *Attorney, Agent, or Firm*—Kenyon & Kenyon LLP

(57) ABSTRACT

There is provided a lighting device for illuminating objects inside an enclosure including a housing, an array of light emitting diodes enclosed by the housing consisting of at least two groups of diodes, one group emitting substantially white light and one group emitting colored light, a DC to DC converter feeding the light-emitting diodes and enclosed by the housing, and a light intensity controller for operating each of the groups of diodes at variable light intensities.

12 Claims, 3 Drawing Sheets

LIGHTING DEVICE

This Application is a Continuation-in-Part Application of U.S. patent application Ser. No. 10/879,084, filed Jun. 30, 2004 now abandoned.

FIELD OF THE INVENTION

The present invention relates to a lighting device and more particularly, to a lighting device suitable for military use, especially in vehicles.

BACKGROUND OF THE INVENTION

There often exists a need, both for military and civilian purposes, to utilize a lighting device which can provide regular bright illumination as commonly required, as well as to selectively provide lighting of a different nature, e.g., white and colored lights of limited illumination or of controllable light intensity.

DISCLOSURE OF THE INVENTION

According to the present invention, there is therefore provided a lighting device for illuminating objects inside an enclosure comprising a housing, an array of light emitting diodes enclosed by said housing consisting of at least two groups of diodes, at least one group emitting substantially white light and at least one group emitting colored light, a DC to DC converter feeding said light-emitting diodes and enclosed by said housing, and at least one light intensity control means for operating each of said groups of diodes at variable light intensities.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a top view of the lighting device according to the present invention;

FIG. 2 is an isometric view of the base plate of the lighting device of FIG. 1;

FIG. 3 is an isometric view of a further embodiment of the invention;

FIG. 4 is a rear view of the enclosure of the lighting device of FIG. 3, and FIG. 5 is a block diagram for energizing and controlling the lighting device according to the present invention.

DETAILED DESCRIPTION

Figure 1:
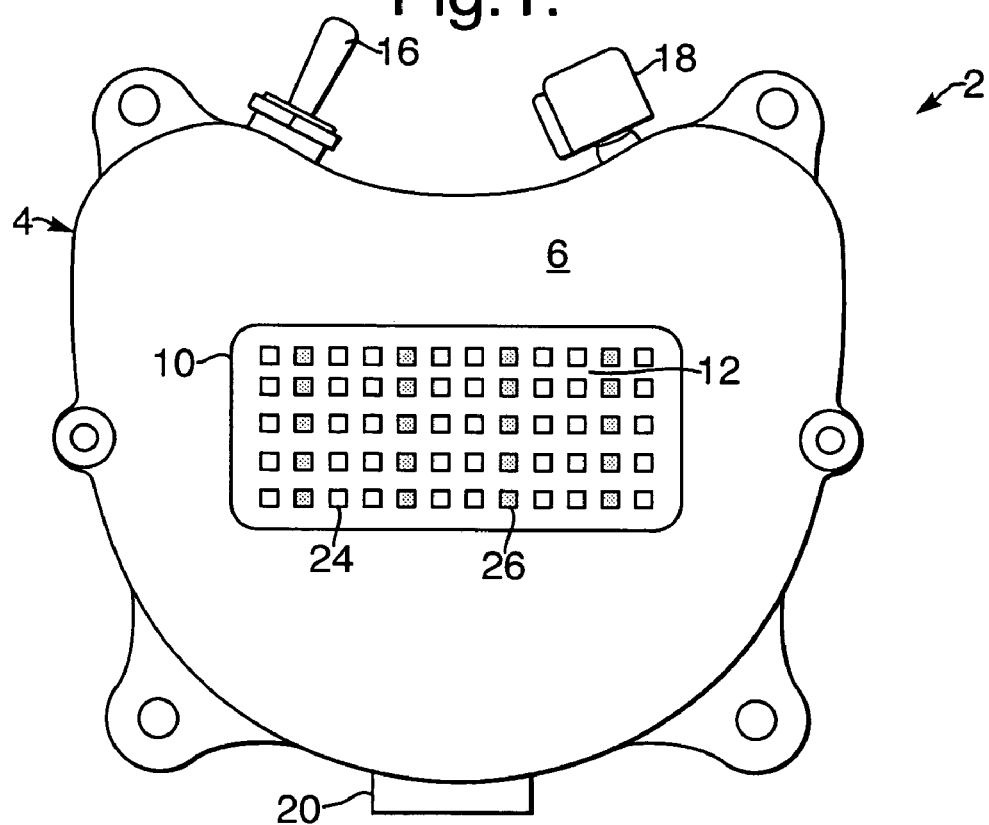
Figure 2:
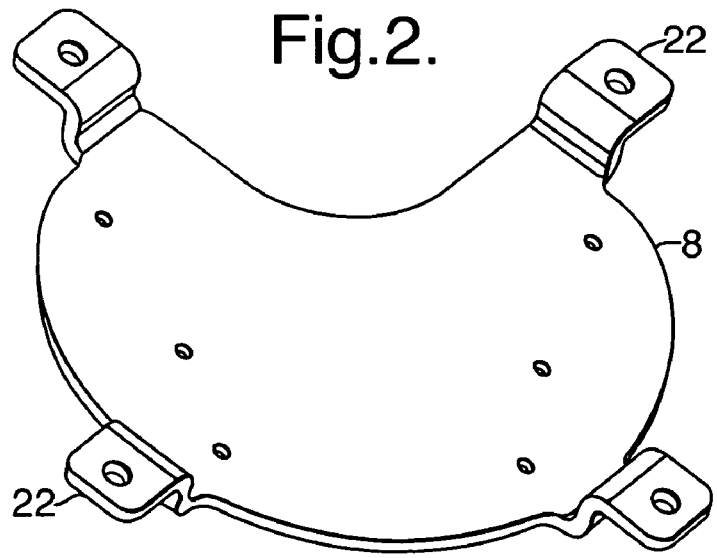

A first embodiment of a lighting device 2 according to the present invention is illustrated in FIGS. 1 and 2. Seen is a housing 4 advantageously a two-part housing composed of an enclosure 6 and a base plate 8 of a curved configuration, hermetically sealed to render it waterproof. The housing parts 6 and 8 are interconnectable in any per-se known manner such as by press fitting and/or by screws. The enclosure 6 has an opening 10, protected by a transparent cover, preferably made of polycarbonate, accommodating an array of LEDs 12, details of which will be described hereinafter. Further seen is a selector embodied by a toggle switch 16 and a member 18 for adjusting a light intensity controller, e.g., a potentiometer or a logic circuit, for dimming or brightening the LEDs 12. Also provided is an inlet electrical port 20. The base plate 8 is preferably made with flanges 22, facilitating anchoring of the housing 4 to a wall or ceiling.

The PCB-mounted array of LEDs 12, advantageously consists of 32 white LEDs 24 interlaced with 16 blue (wavelength ~470 nm), green or red LEDs 26 providing an active LED area of approximately 30×68 mm. The 32 white LEDs 24 are energized from a 160 mA, 14 Vdc source, while the 16 blue LEDs 26 are energized from 100 mA, 14 Vdc source. The desired luminous intensity of each white LED is typically ~400 mcd at 120 degrees.

The white LEDs provide light for general activity, e.g., map reading, orientation etc. during daytime and nocturnal non-combat activities, whereas the blue LEDs provide light for nocturnal combat activity. The advantage of blue light during combat activity is that blue light is less detectable by night vision equipment of the enemy in the event that some of it leaks out through openings in the vehicle, e.g., periscope. Alternatively, red (wavelength ~630 nm) LEDs may be used instead of the blue ones during nocturnal activity. The advantage of red light is that (although detectable by night vision equipment) it does not impair the high sensitivity of the dark-adapted human eye.

Figure 3:
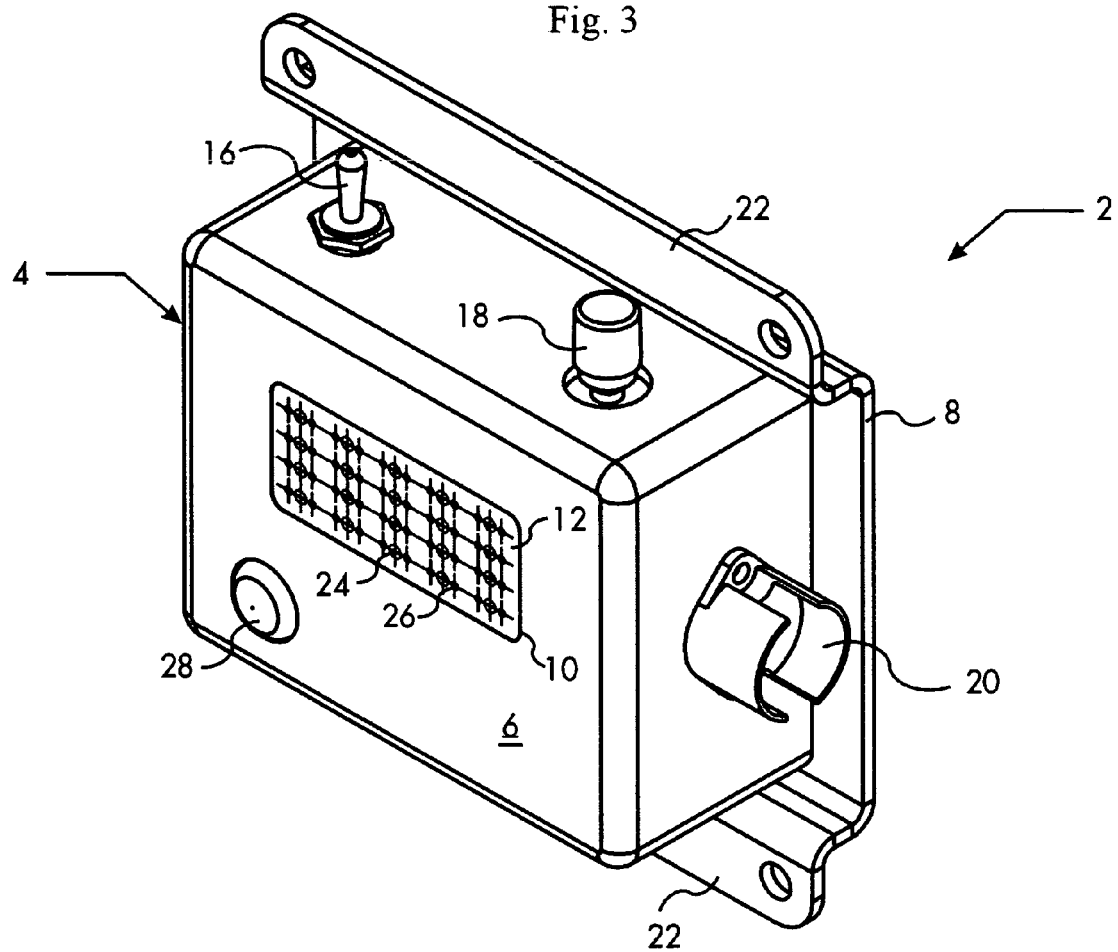
Figure 4:
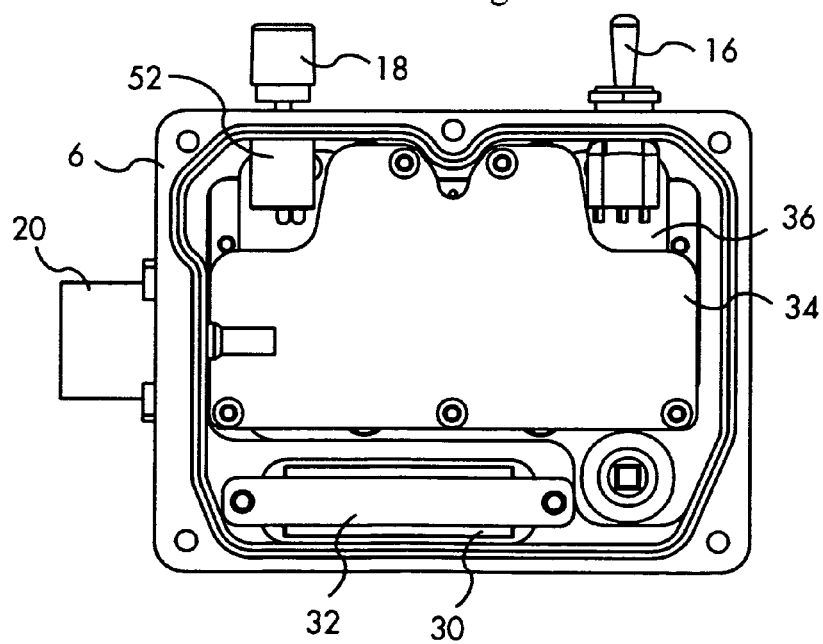

Referring to FIGS. 3 and 4, there is illustrated a further embodiment of the lighting device 2 according to the present invention. Seen is the enclosure 6, the base plate 8 to which the enclosure 6 is attachable, the opening 10, protected by a transparent cover, the array of white and colored LEDs 12, an emergency button 28, as well as other parts of the device numbered by the same numbers allocated to the various parts shown in FIGS. 1 and 2. Inside the enclosure 6 (FIG. 4) there are further located a powerpack 30 held in position by a support plate 32, a PCB 34 and a heat sink 36 for dispersing the heat generated by the LEDs 12.

The device 2 is externally powered from a DC source, e.g., 18-36 Vdc of a vehicle's battery 38 (FIG. 5), through input plugs and/or sockets 20 and optionally includes an internal rechargeable powerpack 30, which is held in position by a support plate 32. The powerpack 30 may be formed by two sub-units, one operable for short periods of time using a super-capacitor, while the other sub-unit for a longer period of time, utilizing rechargeable batteries. The internal powerpack 30 enables the lighting device to provide light even in a damaged vehicle thus, for example, assisting the crew to escape and/or be rescued from the damaged vehicle. Furthermore, the internal powerpack 30 facilitates utilization of the device as an independent portable flashlight.

Figure 5:
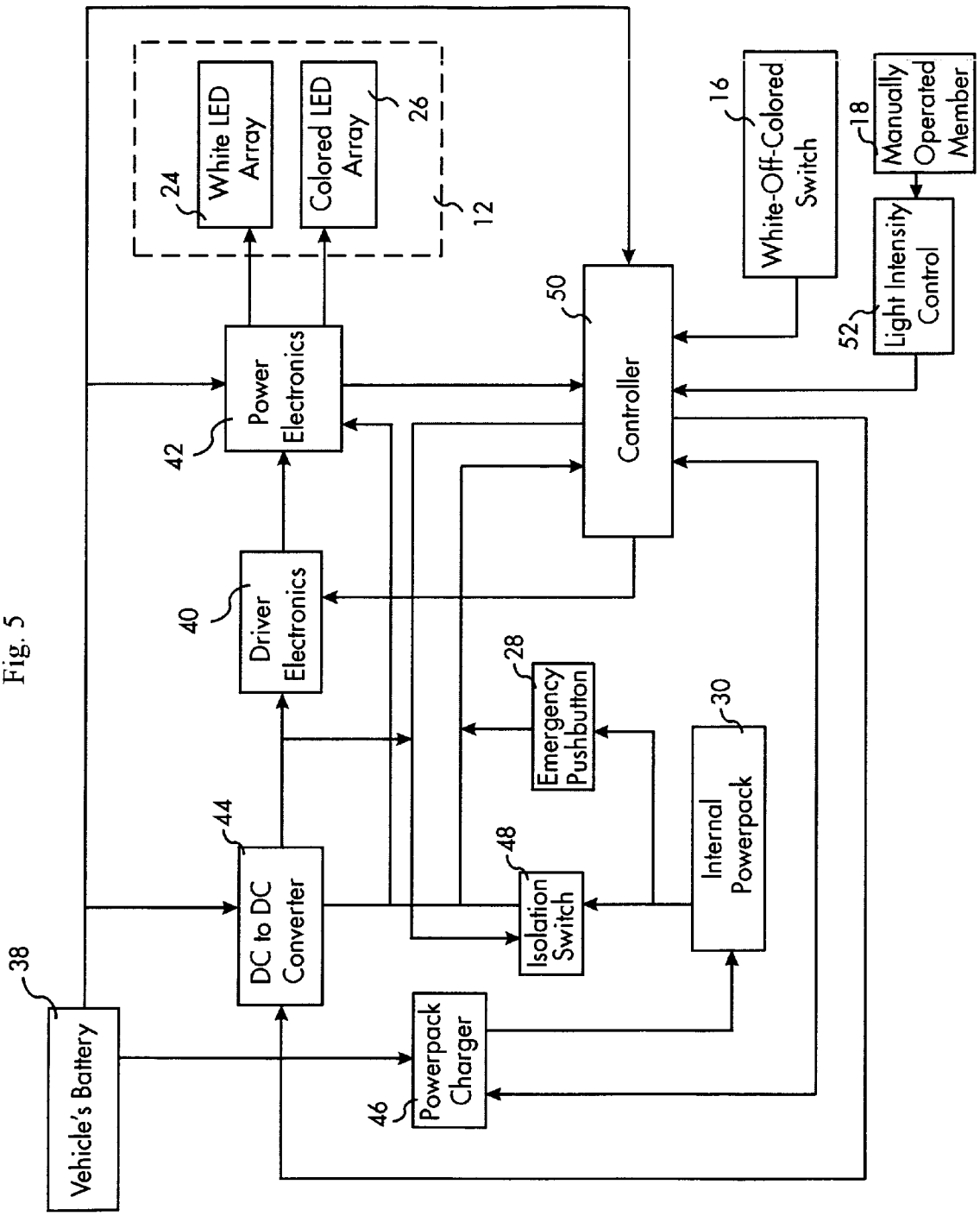

Turning now to FIG. 5, there is illustrated a block diagram of the lighting device according to the present invention, illustrating the structure and operation of the lighting device. Under normal conditions the vehicle's battery 38 feeds the driver and power electronics 40, 42, the LEDs 12 via a DC to DC converter 44 and the powerpack charger 46. When the vehicle's battery is disconnected due to some reason, the internal powerpack 30, which may be of a lower voltage than the vehicle's voltage, e.g., 3.6 Vdc, is automatically enabled for a predetermined short period of emergency operation, e.g., 30 seconds. An additional period (e.g., 15 minutes) of emergency operation is selectable by briefly pressing the emergency pushbutton 28. This can be repeated several times with total emergency capacity of at least 60 minutes. The isolation switch 48 prevents unnecessary discharge of the powerpack 30. The controller 50 controls the entire electronic circuit (the circuit may also include a low noise built-in EMI RFI filter) during normal and emergency operations according to the program fused into its memory, as well as the data that flows into its inputs from the circuit components, the vehicle's battery and the environment. Furthermore, the controller 50 also monitors the voltage of the vehicle's battery 38 and renders the LEDs 12 blinking when this voltage falls under a predetermined value. This feature is particularly important during a silent ambush, when the vehicle's engine is not working and the vehicle's restart is dependable on the vehicle's batteries being sufficiently charged.

The light intensity control 52 serves for controlling the variable light intensity of at least one group of the two groups of light emitting diodes, for the purpose of dimming or brightening same. It may be activated manually by the manipulatable member 18 or by any per-se known manner such as a selector, a keypad, a proximity sensor, etc. It can also be activated by a software program either directly or via a communication line.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A lighting device for illuminating objects inside a vehicular enclosure, said lighting device comprising:
    a housing;
    an array of light-emitting diodes within said housing consisting of at least a first and a second group of diodes;
    said first group emitting substantially white light providing light for general activity during day time and nocturnal non-combat activities;
    said second group emitting colored light consisting of blue light of wavelength ~470 nm up to green light for nocturnal combat activity that is less detectable by night vision equipment, or red light of wavelength ~630 nm to be used instead of said blue light, to provide light during nocturnal activity that does not impair high sensitivity of a dark-adapted human eye;
    at least one light control means for operating each of said groups of diodes; and
    a controller for controlling the operation of the device, including monitoring a vehicle's power supply.

2. The lighting device as claimed in claim 1, further comprising means for attaching the device to a wall or ceiling of an enclosure.

3. The lighting device as claimed in claim 1, wherein said housing is a two-part, hermetically sealed, housing.

4. The lighting device as claimed in claim 1, wherein said controller is adapted to cause the light-emitting diodes to blink when the voltage of said vehicle's power supply falls below a predetermined value.

5. The lighting device as claimed in claim 1, further comprising a heat sink for dispersing heat generated by said light emitting diodes.

6. A lighting device for illuminating objects inside a vehicular enclosure, said lighting device comprising:
    a housing;
    an array of light-emitting diodes within said housing consisting of at least a first and a second group of diodes;
    said first group emitting substantially white light providing light for general activity during day time and nocturnal non-combat activities;
    said second group emitting colored light consisting of blue light of wavelength ~470 nm up to green light for nocturnal combat activity that is less detectable by night vision equipment, or red light of wavelength ~630 nm to be used instead of said blue light, to provide light during nocturnal activity that does not impair high sensitivity of a dark-adapted human eye; and
    at least one light control means for operating each of said groups of diodes;
    wherein said housing comprises a DC to DC converter feeding said light-emitting diodes and enclosed by said housing.

7. The lighting device as claimed in claim 6, wherein said converter is fed from the battery of a vehicle.

8. The lighting device as claimed in claim 6, further comprising a rechargeable powerpack unit enclosed in said housing and selectively operating said converter.

9. The lighting device as claimed in claim 8, wherein the lighting device is connectable to a vehicle's battery and, upon disconnection of the vehicle's battery, said rechargeable powerpack is automatically activated for a predetermined period of time and wherein additional periods of operations are selectable.

10. The lighting device as claimed in claim 6, further comprising means for attaching the device to a wall or ceiling of said enclosure.

11. The lighting device as claimed in claim 6, wherein said housing is a two-part, hermetically sealed, housing.

12. The lighting device as claimed in claim 6, further comprising a heat sink for dissipating heat generated by said light emitting diodes.

* * * * *